United States Patent
Casteel, Jr.

(10) Patent No.: US 8,758,945 B2
(45) Date of Patent: Jun. 24, 2014

(54) OVERCHARGE PROTECTION BY COUPLING REDOX SHUTTLE CHEMISTRY WITH RADICAL POLYMERIZATION ADDITIVES

(75) Inventor: William Jack Casteel, Jr., Fountain Hill, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 1189 days.

(21) Appl. No.: 12/042,387

(22) Filed: Mar. 5, 2008

(65) Prior Publication Data

US 2008/0220335 A1   Sep. 11, 2008

Related U.S. Application Data

(60) Provisional application No. 60/905,172, filed on Mar. 6, 2007.

(51) Int. Cl.
*H01M 6/18* (2006.01)

(52) U.S. Cl.
USPC ........... 429/323; 429/322; 429/327; 429/330; 429/332; 429/200; 429/231.8; 429/231.4; 429/231.1

(58) Field of Classification Search
USPC ............... 429/323, 322, 327, 330, 332, 200, 429/231.8, 231.4, 231.1
See application file for complete search history.

(56) References Cited

U.S. PATENT DOCUMENTS

| | | | |
|---|---|---|---|
| 4,331,743 A | 5/1982 | Dey et al. | |
| 7,785,740 B2 * | 8/2010 | Amine et al. | 429/200 |
| 2005/0053841 A1 | 3/2005 | Ivanov et al. | |
| 2005/0064288 A1 | 3/2005 | Ivanov et al. | |
| 2005/0227143 A1 | 10/2005 | Amine et al. | |
| 2007/0166609 A1 | 7/2007 | Lee et al. | |

FOREIGN PATENT DOCUMENTS

| | | |
|---|---|---|
| EP | 0 759 641 A1 | 2/1997 |
| EP | 1 335 445 A1 | 8/2003 |
| EP | 1 361 622 A1 | 11/2003 |
| EP | 1 513 215 A2 | 3/2005 |
| EP | 1 587 158 A2 | 10/2005 |
| EP | 1 630 895 A2 | 3/2006 |

OTHER PUBLICATIONS

Xu, Kang; "Nonaqueous Liquid Electrolytes for Lithium-Based Rechargeable Batters;" Chem Rev. 2004, 104, (2004) pp. 4303-4417.
Lee, et al; "Co-Use of Cyclohexyl Benzene and Biphenyl for Overcharge Protection of Lithium-Ion Batters;" Electrochemical and Solid-State Letters, 9 (6) (2006) pp. A307-A310.

* cited by examiner

*Primary Examiner* — Laura Weiner
(74) *Attorney, Agent, or Firm* — Michael K. Boyer

(57) ABSTRACT

The over charge protection of a lithium ion cell is improved by using an electrolyte comprising at least one redox shuttle additive that comprises an in situ generated soluble oxidizer or oxidant to accelerate other forms of chemical overcharge protection. The oxidizer can be employed in combination with radical polymerization additives.

12 Claims, No Drawings

OVERCHARGE PROTECTION BY COUPLING REDOX SHUTTLE CHEMISTRY WITH RADICAL POLYMERIZATION ADDITIVES

This Application claims the benefit of Provisional Application No. 60/905,172, filed on Mar. 6, 2007. The disclosure of this Application is hereby incorporated by reference.

CROSS-REFERENCE TO RELATED APPLICATIONS

The subject of the instant invention is related to U.S. patent application Ser. Nos. 10/655476, now U.S. Pat. No. 7,311,993; Ser. No. 10/924,293, now U.S. Pat. No 7,348,103; Ser. No. 11/372,907, now abandonded; and Ser. No. 11/197,478, now U.S. Pat. No 7,465,517. The disclosure of the previously identified patent applications is hereby incorporated by reference.

FIELD OF THE INVENTION

The subject matter of this invention relates to providing a dodecaborate containing electrolyte having at least one overcharge protection additive, and a lithium ion battery having improved overcharge protection.

BACKGROUND OF THE INVENTION

One method for providing overcharge protection is described by Xu, Chem. Reviews, 2004, 104 pp. 4303-4417. Xu describes wide range of electrolyte additives which provide both reversible and irreversible, or shutdown overcharge protection. The reversible protection is afforded by the so-called "redox shuttle" agents in which the redox additive is transformed into its oxidized form at the surface of the overcharged positive electrode. This oxidized form diffuses back to the negative electrode where it is reduced back to its original form. This reversible couple provides a system which can limit the cell potential during overcharge. While such systems offer the advantage of some reversibility and thereby potential protection against repeated overcharge excursions within the cell, there are limitations. Such shuttle chemistry can be limited by diffusion and concentration and therefore typically operates at rates below 1C. Furthermore this shuttle chemistry can generate heat and temperature increases in the cell which lead to irreversible changes in the cell. Compositions based on substituted ferrocenes and substituted aromatics, particularly those based on methoxy-substituted aromatics have been used in these applications. These methods are also described in U.S. Pat. No. 6,045,952; hereby incorporated by reference Xu also describes a class of "shut-down additives," which undergo irreversible chemistry in lithium ion cells and, thereby, serve to "shut down" the charging of a cell on overcharge. Such additives trigger an irreversible, one time charging cut-off and usually achieve this through: i) gas generation, which can open a current interrupter device, or ii) through polymerization, which lead to reduction of current flow due to resistance increase in the cell. Pyrocarbonates and to a lesser extent biphenyl are effective gas generators on overcharge, and biphenyl and cyclohexylbenzene are able to undergo polymerization at the overcharged positive electrode triggering resistance increase within the cell. While such additives can be effective at moderate rates of overcharge of about 1C, their ability to prevent thermal runaway reactions at higher rates of overcharge is typically limited.

In US20050227143 A1, Amine et. al., describe the use of the fluorinated dodecaborate electrolyte salts disclosed in US20050053841 A1 and US20050064288 A1 as electrolytes which can provide redox shuttle additives that are capable of providing improved overcharge protection. The disclosure of the foregoing patent application publications is hereby incorporated by reference. Because the salts are also electrolytes and can be used in higher concentration than previous shuttle molecules, they allow overcharge protection at rates between about 1 and about 3 C. While usage of such salts in greater concentrations allows enhanced overcharge protection in comparison to standard redox shuttle additives, in some cases these salts may have limited reversibility when the system is overcharged.

Lee, H.; Lee, J. H.; Ahn, S.; Kim, H. J.; Cho, J. J.; Electrochemical and Solid State Letters, 2006, 9, (6), pp. A307-A310 has disclosed that a combination of 2 shut-down additives, biphenyl and cyclohexylbenzene has a synergistic effect by increasing the rate and thickness of resistive film formation at the positive electrode on overcharge.

There is a need in this art for an electrolyte and lithium ion battery having improved overcharge protection.

BRIEF SUMMARY OF THE INVENTION

The instant invention solves problems associated with lithium ion batteries (e.g., secondary batteries), by employing redox shuttle and radical polymerization additives. A combination of such additives achieves a synergistic affect not achieved by using these additives individually.

Without wishing to be bound by any theory or explanation, it is believed that the soluble oxidized species or oxidant generated by the redox shuttle additive can rapidly oxidize certain shutdown additives (e.g., radical polymerization additives) thereby causing thickening and eventual polymerization of the entire electrolyte and in turn end electrochemical operation of a cell within the battery. It is also believed that the shuttle chemistry reaction when combined with the shutdown additive will be more facile than an electrochemical oxidation (e.g., which relies on diffusion of the additive to the positive electrode). It is further believed that the redox additive's voltage holding capability will enable polymerization to occur and shutdown the cell even at high rates of overcharge.

DETAILED DESCRIPTION OF THE INVENTION

The following terms are used in connection with this Description:

The term "nonreversibly oxidizable salt" or variants thereof refer to salts that, when used in the electrolyte of a cell in a lithium ion battery, without an overcharge protection salt or other means for overcharge protection are susceptible to detrimental overcharging, because they do not reversibly oxidize or do not reversibly oxidize at a sufficient rate to prevent overcharging.

The terms "battery", "electrochemical cell" and "cell" may be used interchangeably herein, although a battery may comprise one to hundreds or more cells.

A "cell" is used to generate current by a chemical reaction. Additionally, the electrochemical cells of this invention can be used in batteries, fuel cells and ultracapacitors, among other energy conversion devices.

The term "carrier" is used to refer to a single solvent or a mixture of two or more solvents or any other material, for example, a polymer backbone, that dissolves and dissociates the one or more salts in the electrolyte so that the electrolyte contains solvated ions.

The term "electrolyte" means the part of the battery that contains the overcharge protection additives of this invention, optionally including one or more nonreversibly oxidizable salts, and optionally including carriers and other additives. Other additives include passive film forming additives, flame retardant additives, among other additives.

The term "electrolyte salt" is used to mean a salt or salts that dissociate into current carrying ions and may include nonreversible oxidizable salts and/or the overcharge protection salts described in US 20050227143 A1 (hereby incorporated by reference).

The term "electrolyte solution" is used to mean one or more of the overcharge protection additives of this invention dissolved in a carrier, optionally including one or more nonreversible electrolyte salts, and optionally including other additives.

Cells of the 3 to 5 volt, or the 4 volt class typically operate over a voltage range of about 3.2 to 5 volts. One presently popular lithium ion cell comprises a lithium oxide (e.g., a lithium cobalt oxide) cathode and graphite anode and typically operates over a design voltage range from 2.9 to 4.2 volts. After discharge, these cells, if desired, can be recharged. In those cases where the lithium cell includes a non-reversibly oxidized salt, there is the possibility to overcharge the cell, particularly in those cases where there is a failure of the electronic circuitry controlling voltage. Overcharging the cell (e.g., effecting a voltage continuation beyond a range of about 0.1 to 2 volt higher than the voltage rating of the cell) may result in degradation of the cathode and can cause degradation of the carrier and creation of significant amounts of heat and other undesirable results.

The instant invention relates to improving the over charge protection of a lithium ion cell by using an electrolyte solution comprising at least one redox shuttle additive that comprises an in-situ generated soluble-oxidizer or oxidant to accelerate other forms of chemical overcharge protection. While any suitable in situ generated oxidizer can be employed, an example of such an oxidizer comprises the oxidized product of $B_{12}F_xH_{12-x}^{2-}$. While the soluble oxidizer can be employed with any other suitable protection chemistry, the oxidizer can be employed in combination with radical polymerization additives.

The present invention is directed to an improvement in a cell, that may be a secondary lithium ion cell, and may be of the 3 to 5 volt class, and particularly the 4 volt class comprised of a negative electrode, a positive electrode, a separator and an electrolyte. The electrolyte comprises a first overcharge protection additive, which can be oxidized to form a soluble oxidant, a second overcharge protection additive which undergoes an oxidative polymerization, and at least one carrier. The first additive, which can be oxidized to a soluble form, can comprise at least one of the so-called redox shuttle additives referenced in Xu et. al., and the fluorinated dodecaborate salts referenced in US20050227143 A1. The second additive which undergoes a radical polymerization can comprise at least one of biphenyl, cyclohexylbenzene, substituted benzenes, among others.

The overcharge protection additives are added to the cell, and typically combined with the carrier to form an electrolyte, in an effective amount generally sufficient to provide overcharge protection. The electrolyte can comprise one or more of the additives which form soluble oxidants in combination with one or more shutdown additives. Typically each additive is in a range from 0.01 to 10%, or 0.1 to 10%, or 0.5 to 10%, by weight of the total electrolyte solution weight of the cell.

Because the oxidizable salts described in US20050227143 A1 can also function as electrolyte salts and contribute to the conductivity of the cell, as described in US20050053841 A1, these salts may be used as the only electrolyte salt in the cell, or the electrolyte may further comprise a nonreversibly oxidizable salt. Examples of such salts comprise at least one member selected from the group consisting of:

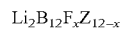

$$Li_2B_{12}F_xZ_{12-x}$$

wherein x is at least 8, and typically at least 10 but not more than 12 and Z represents H, Cl, and Br. Typically, when x is less than 12, Z is Cl or H.

The oxidation potentials of the first overcharge protection additive which forms a soluble oxidant and that of the second overcharge protection additive, which is designed to polymerize or otherwise react to shut-down the cell, can be similar. For a conventional lithium ion cell, these additives will typically exhibit oxidation potentials vs. lithium metal between about 3.2 and about 5.0 volts, typically between about 3.8 and about 4.8 volts and usually between about 4.2 and about 4.6 volts. For another type of cell, the voltage values will differ and be relative to the negative electrode material. To prevent detrimental overcharging of the cell, the oxidation potential (the overcharge protection potential) of these additives is typically about 0.1 to about 2 V or about 0.1 to about 1 V, usually about 0.1 to about 0.5 volts above the design voltage of the cell.

A typical overcharge condition, without the inventive overcharge protection, causes excess reaction at the cathode which can result in irreversible damage to the cathode. This situation can become undesirable if the cathode begins to undergo rapid exothermic reactions with the solvent. The inventive combination of overcharge protection additives protects against this reaction at the cathode by being oxidized at a potential that is less than the potential at which the exothermic cathode solvent reactions begin, and preferably at a potential that is above the potential of a fully charged cell. After the overcharge additives are oxidized, the soluble oxidant additive is able to initiate the shutdown chemistry of the shutdown additive throughout the cell rather than merely at the cathode electrolyte interface. Because the initiation of the overcharge shutdown chemistry no longer solely relies of diffusion of these additive molecules to the cathode, the shutdown chemistry is more efficient and thus provides a relatively rapid interruption to cell current flow in the cell. Furthermore if the soluble oxidant is in the form of a redox shuttle molecule, this molecule can hold the cell at a safe voltage until the full cell shutdown occurs.

In one aspect of the invention, the additives, which form soluble oxidants on overcharge are those selected from the class of redox shuttle additives and exemplified by those described in Xu, Chem. Reviews, 2004, Vol. 104, No. 10, pp. 4372-4378. These additives can comprise at least one of substituted ferrocenes and substituted phenyl compounds such as methoxy-substituted benzenes.

In another aspect of the invention, the additives, which form soluble oxidants are those selected from the class of redox shuttle additives and exemplified by those described in US20050227143 A1. These comprise fluorinated lithium dodecaborate salts (e.g., wherein x is greater than about 9).

The cell or battery of this invention, may be a lithium secondary cell in the 3 to 5 volt, and particularly the 4 volt class cells. The negative electrodes, or anodes for use in a cell of this invention may comprise non-graphitizing carbon, natural or artificial graphite carbon, tin oxide, lithium, silicon, or germanium compound, there compounds, or alloys thereof. Any of the conventional negative electrode compositions may be used in combination with the overcharge protection additive combinations of this invention.

The positive electrode, or cathode for use in cells can comprise any known compositions employed in cells. For lithium or lithium-ion cells, typically, a lithium transition metal/main group metal composite oxide is used as the positive electrode. The cathode in such a cell may be comprised of $LiCoO_2$, $LiNiO_2$, $LiNi_{1-x}Co_yMet_zO_2$, $LiMn_{0.5}Ni_{0.5}O_2$, $LiMn_{0.3}Co_{0.3}Ni_{0.3}O_2$, $LiFePO_4$, $LiMn_2O_4$, $LiFeO_2$, $LiMet_{0.5}Mn1.5O_4$, vanadium oxide, or mixtures of any two or more thereof, wherein Met is Al, Mg, Ti, B, Ga, Si, Ni, or Co, and wherein $0<x<0.3$, $0<z<0.5$, $0<y<0.5$. In other embodiments, the positive electrode is comprised of a spinel manganese oxide with a formula of $Li_{1+x}Mn_{2-z}Met_yO_{4-m}X_n$, wherein Met is Al, Mg, Ti, B, Ga, Si, Ni, or Co, and X is S or F, and wherein $0<x<0.3$, $0<z<0.5$, $0<y<0.5$, $0<m<0.5$ and $0<n<0.5$.

The carriers of this invention can be organic or inorganic carriers. The carriers may be aprotic. Aprotic inorganic carriers include $SO_2$, $SOCl_2$, $SO_2Cl_2$ and the like.

Aprotic organic solvents or carriers for the cells and batteries of this invention generally are anhydrous. Examples of common aprotic solvents or carriers for forming the electrolyte system in the cell include dimethyl carbonate (DMC), ethyl methyl carbonate (EMC), diethyl carbonate (DEC), methyl propyl carbonate (MPC), ethyl propyl carbonate (EPC), ethylene carbonate (EC), propylene carbonate (PC), dipropyl carbonate (DPC), fluoroethylene carbonate (FEC), difluoroethylene carbonate (DFEC), bis(trifluoroethyl)carbonate, bis(pentafluoropropyl)carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, among other organic carbonates, fluorinated oligomers, methyl propionate, butyl propionate, ethyl propionate, sulfolane, 1,2-dimethoxyethane, 1,2-diethoxyethane, tetrahydrofuran, 1,3-dioxolane, 4-methyl-1,3-dioxolane dimethoxyethane, triglyme, dimethylvinylene carbonate, tetraethyleneglycol, dimethyl ether, polyethylene glycols, sulfones, and gamma-butyrolactone (GBL), vinylene carbonate, chloroethylene carbonate, methyl butyrate, ethyl butyrate, ethyl acetate, gamma-valerolactone, gamma-butyrolactone, ethyl valerate, 2-methyl-tetrahydrofuran, 3-methyl-2-oxazolidinone, 1,3-dioxolane, 4-methyl-1,3-dioxolane, vinylethylene carbonate and 2-methyl-1,3-dioxolane.

Typically the salts present in the electrolytes are present in an amount from 0.3 to 1.2 moles per liter of the electrolyte solution; however, smaller or larger amounts are possible. Representative nonreversibly oxidizable salts that may be employed in the 3 to 5 volt, and particularly the 4 volt, class of cells include lithium salts, such as lithium perchlorate, lithium hexafluorophosphate, lithium hexafluoroarsenate, lithium trifluoromethylsulfonate, lithium tetrafluoroborate, lithium tetrakis(pentafluorophenyl)borate lithium bromide, lithium hexafluoroantimonate, $LiB(C_6H_5)_4$, $LiN(SO_2CF_3)_2$, $LiN(SO_2CF_2CF_3)$ and lithium bis(chelato)borates such as $Li[(C_2O_4)_2B]$, lithium bis(dicarboxylic acid)borate, lithium difluorooxalatoborate $Li(C_2O_4)BF_2$, $LiBF_3C_2F_5$ and $LiPF_3(CF_2CF_3)_3$ or a mixture of any two or more thereof. The aforementioned salts can be combined with other electrolyte salts such as salts having the formula:

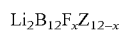

$$Li_2B_{12}F_xZ_{12-x}$$

wherein x is at least 8, and typically at least 10 but not more than 12 and Z represents H, Cl, and Br. Typically, when x is less than 12, Z is Cl or H.

In another embodiment of cell of this invention, the electrolyte system can comprise an aprotic gel polymer carrier/solvent. Suitable gel polymer carrier/solvents include polyethers, polyethylene oxides, polyimides, polyphosphazines, polyacrylonitriles, polysiloxanes, polyether grafted polysiloxanes, derivatives of the foregoing, copolymers of the foregoing, crosslinked and network structures of the foregoing, blends of the foregoing, and the like, to which is added an appropriate ionic electrolyte salt. Other gel-polymer carrier/solvents employed in lithium cells include those prepared from polymer matrices derived from polypropylene oxides, polysiloxanes, sulfonated polyimides, perfluorinated membranes (Nafion® resins), divinyl polyethylene glycols, polyethylene glycol-bis-(methyl acrylates), polyethylene glycol-bis(methyl methacrylates), derivatives of the foregoing, copolymers of the foregoing, crosslinked and network structures of the foregoing.

Cells of this invention may additionally comprise a separator. The separator for the cell often is a microporous polymer film. Examples of polymers for forming films include: nylon, cellulose, nitrocellulose, polysulfone, polyacrylonitrile, polyvinylidene fluoride, polypropylene, polyethylene, polybutene, and the like. Any of the polymer carriers listed above can also serve as a separator. Recently, ceramic separators have been evaluated.

The cell is not limited to particular shapes, and can take any appropriate shape such as cylindrical shape, a coin shape, a square, or prismatic shape. A lithium cell comprised of a plurality of cells is also not limited to particular capacities, and can have any appropriate capacity, for example, from the amount needed for small appliances to the capacity required for hybrid electric and electric cars. The cell of this invention may further comprise additional overcharge protection means, if desired, such as redox shuttle additives or electronic circuits, known to a person of skill in the art.

The following Examples illustrate certain aspects of the invention and do not limit the scope of the claims appended hereto.

EXAMPLES

Comparative Example 1

Preparation of an Electrolyte Formulation Containing Only a Radical Polymerizable Material as a Shutdown Additive An electrolyte solution is made containing a standard electrolyte salt and one overcharge protection additive in the form of a shutdown additive. This solution consists of 15 g (100 mmol) $LiPF_6$ and 2.2 g (14 mmol) of biphenyl dissolved in 100 mL 1EC:1EMC (weight basis).

Comparative Example 2

Preparation of an Electrolyte Formulation Containing Only a Radical Polymerizable Material as a Shutdown Additive An electrolyte solution is made containing a standard electrolyte salt and one overcharge protection additive in the form of a shutdown additive. This solution consists of 15 g (100 mmol) LiPF$_6$ and 2.2 g (14 mmol) of cyclohexyl benzene dissolved in 100 mL 1EC:1EMC (weight basis).

Example 1

Preparation of an Electrolyte Formulation Containing a Radical Polymerizable Material as a Shutdown Additive and a Soluble Oxidant which can Undergo Redox Shuttle An electrolyte solution is made containing a fluorododecaborate electrolyte salt, which can undergo redox shuttling above 4.2V and one overcharge protection additive in the form of a shutdown additive. This solution consists of 14 g (40 mmol) Li$_2$B$_{12}$F$_{11}$H, 1.5 g (10 mmol) LiPF$_6$ and 2.2 g (14 mmol) of biphenyl dissolved in 100 mL 1EC:1EMC (weight basis).

Example 2

Preparation of an Electrolyte Formulation Containing a Radical Polymerizable Material as a Shutdown Additive and a Soluble Oxidant which can Undergo Redox Shuttle An electrolyte solution is made containing a fluorododecaborate electrolyte salt, which can undergo redox shuttling above 4.2V and one overcharge protection additive in the form of a shutdown additive. This solution consists of 14 g (40 mmol) Li$_2$B$_{12}$F$_{11}$H, 1.5 g (10 mmol) LiPF$_6$ and 2.2 g (14 mmol) of cyclohexyl benzene dissolved in 100 mL 1EC: 1EMC (weight basis).

Example 3

Testing of Cells: Graphite(−)//Electrolyte// LiCo$_{0.8}$Ni$_{0.15}$Al$_{0.05}$O$_2$ (+)

Preparation of Lithium-ion Secondary Battery and Measurement of Battery Characteristics A coin type battery cell (diameter 20 mm, thickness 3.2 mm) consisting of a positive electrode, negative electrode, separator and electrolyte is prepared at room temperature. The positive electrode, referred to as GEN2, consists of LiCo$_{0.8}$Ni$_{0.15}$Al$_{0.05}$O$_2$ (cathode active material) 84% by weight, carbon black (conducting agent) 4% by weight, SFG-6 graphite (conducting agent) 4% by weight, and polyvinylidene fluoride (binder) 8% by weight on an aluminum foil current collector. The negative electrode, referred to as GDR, consists of graphite (anode active material) 92% by weight, and polyvinylidene fluoride (binder) 8% by weight on a copper foil current collector. Celgard™ 3501 (available from Celgard Inc.), a microporous polypropylene film, is used as the separator. The electrolytes of Comparative Examples 1 and 2 and Examples 1 and 2 are added.

The cells are charged by a constant current of 0.1 mA (C/20) to a voltage of 4.1 V followed by a discharge current of 0.1 mA (C/20) to 3V. This cycling is repeated a second time to complete the formation cycling of the cells. For the overcharging performance test, the cells are cycled between 3 volts and 5.5 volts using a constant current (10 mA) charge and discharge at a current density of 0.67 mA/cm$^2$.

The present invention is not limited in scope by the specific aspects disclosed in the examples which are intended as illustrations of a few aspects of the invention and any embodiments that are functionally equivalent are within the scope of this invention. Indeed, various modifications of the invention in addition to those shown and described herein will become apparent to those skilled in the art and are intended to fall within the scope of the appended claims.

The invention claimed is:

1. A secondary lithium ion battery comprising an anode, a cathode and an electrolyte comprising at least one aprotic organic solvent, at least one electrolyte salt of the formula:

$$Li_2B_{12}F_xZ_{12-x}$$

wherein x is at least 8 and less than or equal to 12 and Z comprises at least one of Cl, Br and H; at least one oxidized product of $(B_{12}F_xZ_{12-x})^{2-}$, and at least one member selected from the group consisting of biphenyl, cyclohexylbenzene and methoxy-substituted benzenes; and wherein the electrolyte salt further comprises at least one other lithium containing salt.

2. The battery of claim 1 wherein the oxidized product is generated in situ.

3. The battery of claim 1 wherein the aprotic organic solvent comprises at least one carbonate.

4. The battery of claim 1 wherein the anode comprises a carbonaceous material.

5. The battery of claim 1 wherein the cathode comprises a lithium oxide composite.

6. The battery of claim 1 further comprising a separator.

7. The battery of claim 1 wherein said at least one other lithium containing salt comprises at least one member selected from the group consisting of lithium perchlorate, lithium hexafluorophosphate, lithium hexafluoroarsenate, lithium trifluoromethylsulfonate, lithium tetrafluoroborate, lithium tetrakis(pentafluorophenyl)borate lithium bromide, lithium hexafluoroantimonate, LiB(C$_6$H$_5$)$_4$, LiN(SO$_2$CF$_3$)$_2$, LiN(SO$_2$CF$_2$CF$_3$) and lithium bis(chelato)borates such as Li[(C$_2$O$_4$)$_2$B], lithium bis (dicarboxylic acid) borate, lithium difluorooxalatoborate Li(C$_2$O$_4$)BF$_2$, LiBF$_3$C$_2$F$_5$ and LiPF$_3$(CF$_2$CF$_3$)$_3$.

8. The battery of claim 7 wherein said other lithium containing salt comprises lithium hexafluorophosphate.

9. The battery of claim 1 wherein said solvent comprises at least one member selected from the group consisting of polyethers, polyethylene oxides, polyimides, polyphosphazines, polyacrylonitriles, polysiloxanes, polyether grafted polysiloxanes, derivatives of the foregoing, copolymers of the foregoing, crosslinked and network structures of the foregoing, and blends of the foregoing.

10. The battery of claim 1 wherein said solvent comprises polymer matrices derived from polypropylene oxides, polysiloxanes, sulfonated polyimides, perfluorinated membranes, divinyl polyethylene glycols, polyethylene glycol-bis-(methyl acrylates), polyethylene glycol-bis(methyl methacrylates), derivatives of the foregoing, copolymers of the foregoing, crosslinked and network structures of the foregoing, and combinations thereof.

11. A secondary lithium ion battery comprising an anode, a cathode and an electrolyte comprising at least one aprotic organic solvent, at least one oxidized product of $(B_{12}F_xZ_{12-x})^{2-}$, at least one electrolyte salt of the formula:

$$Li_2B_{12}F_xZ_{12-x}$$

wherein x is at least 8 and less than or equal to 12 and Z comprises H; and at least one member selected from the group consisting of biphenyl, cyclohexylbenzene and methoxy-substituted benzenes.

12. The battery of claim 11 further comprising LiPF$_6$.

* * * * *